(12) United States Patent
Garg et al.

(10) Patent No.: US 10,191,878 B2
(45) Date of Patent: Jan. 29, 2019

(54) HIGH AVAILABILITY OF PCIE DEVICES UNDER MULTIPLE PROCESSORS TO PROVIDE REDUNDANCY

(71) Applicant: Telefonaktiebolaget LM Ericsson (publ), Stockholm (SE)

(72) Inventors: Gaurav Garg, San Jose, CA (US); Tong Ho, San Jose, CA (US)

(73) Assignee: Tolefonaktiebolaget LM Ericsson (Publ), Stockholm (SE)

( * ) Notice: Subject to any disclaimer, the term of this patent is extended or adjusted under 35 U.S.C. 154(b) by 193 days.

(21) Appl. No.: 15/152,387

(22) Filed: May 11, 2016

(65) Prior Publication Data

US 2017/0329735 A1    Nov. 16, 2017

(51) Int. Cl.
G06F 13/00 (2006.01)
G06F 13/40 (2006.01)
G06F 13/42 (2006.01)

(52) U.S. Cl.
CPC ...... *G06F 13/4022* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 2015/0160984 A1* | 6/2015 | Inagaki | G06F 15/17 710/266 |
| 2017/0046295 A1* | 2/2017 | Schwemmer | G06F 13/4022 |
| 2017/0147456 A1* | 5/2017 | Lee | G06F 11/2033 |

OTHER PUBLICATIONS

Avago Technologies, "PCIe Switches and Bridges," downloaded from the internet at <http://www.avagotech.com/products/pcie-switches-bridges/> on May 9, 2016.
Regula, J., "Using PCIe in a variety of multiprocessor system configurations," downloaded from the Internet at <http://www.embedded.com/design/mcus-processors-and-socs/4006788/Using-PCIe-in-a-variety-of-multiprocessor-system-configurationsit> on May 9, 2016, UBM, Jan. 23, 2007.

* cited by examiner

*Primary Examiner* — Henry Tsai
*Assistant Examiner* — Aurangzeb Hassan
(74) *Attorney, Agent, or Firm* — Patent Portfolio Builders, PLLC

(57) ABSTRACT

A method is implemented by a network device to configure the operation of a Peripheral Component Interconnect Express (PCIe) switch to enable an efficient transition from a first active processor in a first root complex to a backup processor in a second root complex. The method involves determining the first active processor in the first root complex and a set of backup processors and a set of root complexes, and configuring each root complex for independent PCIe switch communication. The method further includes detecting a failure of the active processor in the first root complex, selecting and notifying the backup processor and the second root complex to transition to be a second active processor and second root complex, and starting communication with PCIe devices using previously configured independent PCIe switch communication for the second processor of the second root complex.

16 Claims, 3 Drawing Sheets

HIGH AVAILABILITY OF PCIE DEVICES UNDER MULTIPLE PROCESSORS TO PROVIDE REDUNDANCY

TECHNICAL FIELD

Embodiments of the invention relate to the field of network device architecture and redundancy. More specifically, the embodiments provide a method and system for utilizing non-transparent bridging with Peripheral Component Interconnect Express (PCIe) to improve the operation of the network device with a PCIe bus and multiple processor root complexes.

BACKGROUND

Peripheral Component Interconnect Express (PCIe) is a computer serial bus expansion standard that replaced the older PCI standard and similar technologies. A PCIe bus is designed to enable a processor to communicate with peripheral components that are attached to a computer system such as disk drives, storage devices, networking interface cards and similar components. The PCIe specification defines layered architecture that enables multi-gigabit per second serial interface communication between the components of the computer system communicating over the PCIe bus.

In a standard computer system it was expected that a central processing unit or similar processing device would control the PCIe bus via a root complex. The root complex connects the processor and memory subsystems to the PCIe bus, which may be considered a switch fabric composed of any number of switch devices. The root complex generates transaction requests on behalf of the processor. In the basic PCIe architecture the processor and its root complex perform a discovery process during start-up of the system. The discovery process determines what devices or components are connected with the PCIe bus. The discovery process maps these devices into the memory space of the processor. This is generally achieved through transparent bridging where the processor discovers all endpoint in its address domain.

Non-transparent bridge (NTB) is an alternative to transparent bridging where the bridge connects two devices with separate address spaces. The two devices using non-transparent bridging have independent address spaces and considers the other device as an endpoint. The two devices map the other address space to their own address spaces to enable communication. Where NTB is utilized in conjunction with a PCIe bus, the PCIe bus must perform address translation between the two address spaces.

PCIe busses have been utilized in network devices, which were not the original target environment. Such network devices include routers and switches. However, network devices present difficulties for the operation of a PCIe bus where in a network device multiple processing devices and root complexes may be present that communicate with one another over the PCIe bus and with connected components.

SUMMARY

In one embodiment, a method is implemented by a network device to configure the operation of a Peripheral Component Interconnect Express (PCIe) switch to enable an efficient transition from a first active processor in a first root complex to a backup processor in a second root complex. The method involves determining the first active processor in the first root complex and a set of backup processors and a set of root complexes for each respective backup processor in the set of backup processors, and configuring the first root complex and each root complex in the set of root complexes for independent PCIe switch communication. The method further includes detecting a failure of the active processor in the first root complex, selecting and notifying the backup processor and the second root complex to transition to be a second active processor and second root complex, and starting communication with PCIe devices using previously configured independent PCIe switch communication for the second processor of the second root complex.

In another embodiment, a network device is configured to implement a method to configure the operation of a Peripheral Component Interconnect Express (PCIe) switch to enable an efficient transition from an active processor in a first root complex to a backup processor in a second root complex. The network device includes the active processor in the first root complex configured for independent PCIe switch communication, the backup processor in the second root complex configured for independent PCIe switch communication, to detect a failure of the active processor and to start communication with a set of PCI devices using previously configured independent PCIe switch communication, in response to the failure of the active processor, and the PCIe switch coupled to the first root complex and the second root complex, the PCIe switch to enable connectivity with a set of PCIe devices.

In a further embodiment, a non-transitory machine-readable storage medium that provides instructions that, if executed by a network device, will cause the network device to perform operations including determining a first active processor in a first root complex and a set of backup processors and a set of root complexes for each respective backup processor in the set of backup processors, configuring the first root complex and each root complex in the set of root complexes for independent PCIe switch communication, detecting a failure of the active processor in the first root complex, selecting and notifying a backup processor and respective root complex to transition to be a second active processor and second root complex, and starting communication with PCIe devices using previously configured independent PCIe switch communication for the second processor of the second root complex.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
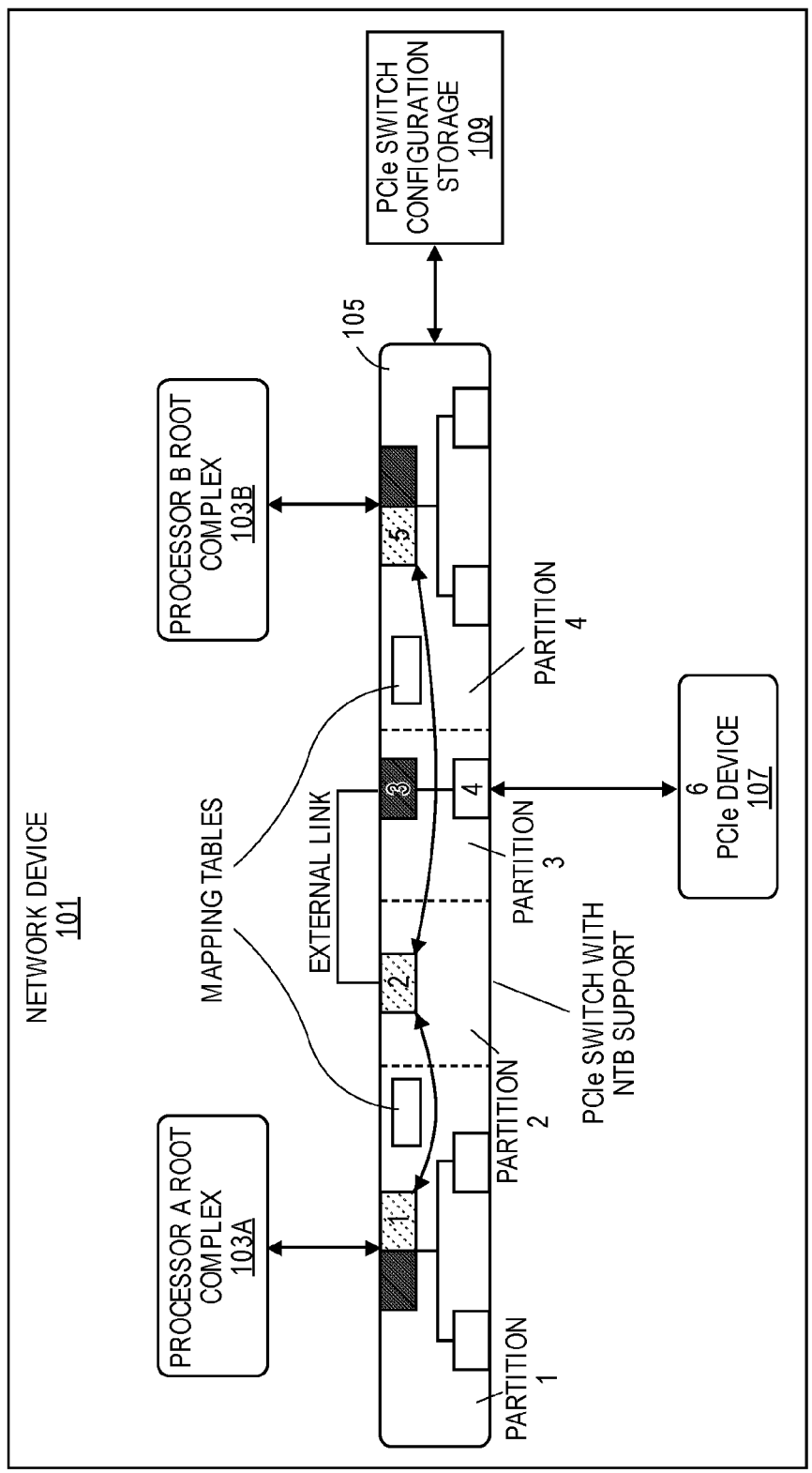
FIG. 1 is a diagram of one embodiment of a network device including a Peripheral Component Interconnect Express (PCIe) switch.

The following description describes methods and apparatus for the improved operation of a network device, specifically, a network device using a Peripheral Component Interconnect express (PCIe) interconnect to enable a set of processors and root complexes to communicate with a set of peripheral devices. The embodiments improve the operation of the network device such that the transition between active processors in the case where the active processor fails is more efficient and involves less disruption of services. The embodiments utilize an independent configuration and operation of an active processor in a first root complex and a backup process or in a second root complex. Each root complex has a separate PCIe partition assigned in the PCIe switch. To communicate with PCIe devices each dedicated partition communicates with an intermediate partition. Thus, each root complex can independently perform enumeration of PCIe devices and thereby enable a quick transition in the event of a failure of the active processor because the backup processor already has an enumeration of PCIe devices in place and does not need to perform the enumeration process at the time of the failure. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Peripheral Component Interconnect Express (PCIe) is being utilized to construct network devices. However, the PCIe architecture was not initially designed for an architecture with multiple root complexes. Rather, the PCIe architecture anticipated being utilized in a general computing device where a central processing unit (CPU) in a single root complex controlled the PCIe architecture. PCIe device manufacture like build PCIe bridge devices, i.e., PCIe chipsets, with non-transparent bridge (NTB) support. NTB is primarily used to hide devices from the CPU of the root complex. The embodiments have improved the NTB support of network devices and the NTB functionality in such network devices to provide high availability of access to PCIe devices in the network device when the network device is designed and running with multiple root complexes.

The embodiments overcome the limitations of the prior art. In the prior art, one PCIe device (i.e., one component connected to the PCIe switch) can be enumerated by a single root complex. If the computing system, e.g., a network device, has multiple processor and multiple root complexes each PCIe device can be enumerated by only one of those processors/root complexes. In the case of a processor failure, there is no solution to efficiently switch control of the PCIe devices to other processors/root complexes, because the new active root complex must re-enumerate the PCIe devices thereby interrupting the activities of the computing system and delaying the newly active root complex from carrying out the tasks of the computing device utilizing the PCIe architecture. This is particularly problematic for the use of such PCIe architecture in a network device, where multiple processors and associated root complexes are present and secondary root complexes are available in a standby status. When the primary root complex and/or processor fails there is significant delay in enabling the backup root complex and processor to take over due to the re-enumeration of the PCIe devices in the network device.

The embodiments of the invention overcome these limitations of the prior art. The embodiments enable the PCIe devices of a network device to be accessed from multiple root complexes. The embodiments utilize a PCIe switch device with non-transparent bridge (NTB) capability. The PCIe devices are connected to multiple root complexes via PCIe Bridge NTB. Since NTB hides the PCIe devices from the root complexes, each root complex sees a separate instance of the PCIe devices via the NTB function. Thus, applications running on different processors of different root complexes that are aware of the existence of a given PCIe device can communicate with this PCIe device via the respective processor and root complex's separate instance of that PCIe device.

Thus, the embodiments provide advantages over the prior art. In the embodiments, the PCIe devices can be controlled by multiple root complexes to provide redundancy at hardware level without the significant loss in efficiency in switching between root complexes due to a failure of a primary root complex and/or processor.

FIG. 1 is a diagram of one embodiment of a network device including a Peripheral Component Interconnect Express (PCIe) switch. The network device 101 is presented by way of example and not limitation. One skilled in the art would understand that the principles, processes and structures described with relation to a network device can also be applied to other devices and contexts. In the example network device 101, the network device 101 includes two processors and associated root complexes 103A and 103B. The processors are labeled A and B. Processor A and processor B are connected and their associated root complexes 103A and 103B are connected to the PCIe switch 105 which has NTB support. The PCIe switch 105 can support any number of attached PCIe devices and any number of processors and root complexes. For sake of clarity, the example illustrates a PCIe switch 105 with two root complexes 103A and 103B and one PCIe device 107 attached.

PCIe switch 105 is configured to enable both processors A and B and associated root complexes 103A and 103B to separately access the PCIe device 107. To enable this separate access the PCIe switch 105 has been configured with four partitions. Each partition works as a separate individual PCIe switch with limited access to other partitions via NTB functionality. Thus, in this example a partition has been set up for each of the root complexes 103A and 103B, partition 1 and partition 4, respectively. Configuration information such as the partitions, NTB functions and the communication between the partitions and NTB functions can be stored in a PCIe switch configuration storage 109. The PCIe switch configuration storage 109 can be any type of storage device, such as an electronically erasable programmable read-only memory (EEPROM), static storage device, dynamic storage device or similar storage devices to store the configuration information of the PCIe switch 105.

Processor A will enumerate all PCIe devices and functions under partition 1 and Processor B will enumerate all PCIe devices under partition 4. In this example, neither of the processors will directly enumerate the PCIe device 107 connected to downstream port 4 as it exists on a different partition (i.e., partition 3). Rather, NTB function 1 and NTB function 5 will acts as PCIe end point functions for Processor A and Processor B, respectively.

NTB function 1 and NTB function 5 can communicate with NTB function 2 which sits in partition 2 using a PCIe switch specific protocol. Each NTB function has global space registers exposed via PCIe extended configuration space. Thus, a Linux user-space/kernel driver running on either processor can access respective NTB PCIe configuration space and communicate with NTB function 2. In this configuration, the processors have therefore separately enumerated the NTB functions 1 and 5 to enable communications with NTB function 2 and indirectly the PCIe device 107.

In this example, processor A may be designated initially as the active processor and root complex 103A as the associated active root complex. While processor A is the active process it is considered to be the master and controls the PCIe device 107. In one embodiment, a Linux user-space driver may access the NTB function 1 configuration space. By accessing the global registers of NTB function 1, the driver generates Type 1/Type 2 PCIe configuration cycles from NTB function 2 for upstream port 3 via the external link. The driver first enumerates upstream port 3 and sets its configuration space. Then the driver sets configuration space of downstream port 4. After that the upstream and downstream ports of partition 3 are configured, then the driver configures PCIe device 107 communicatively coupled with downstream port 4. After this enumeration completes, the last user space driver setups NTB mapping tables in the respective NTB function mapping table registers (these registers are accessible via the PCIe configuration space). The NTB function 2 mapping table will be setup by active or master processor (i.e., processor A).

These configuration details are shared between the user space device driver running on processor A and the user space device driver running on processor B. Thus, if at a later time processor A fails or is unable to communicate with the PCIe switch, then processor B has all the configuration details of the enumerated PCIe devices 2, 3, 4, and 6. Thus, the configuration cycles necessary to re-enumerate and configure each of the PCIe devices can be avoided when the active processor fails, because the backup processor has already been updated with the configuration details and has its own enumeration. User space drivers running on both processors will maintain information of which processor is currently the active process and thus master over the PCIe devices and whether the peer processors are alive.

Memory transactions to PCIe device 107 are carried out via NTB, which uses the NTB Mapping table. For example, when a memory transaction hits NTB function 1 BAR x, BAR x is setup with NTB mapping table. The NTB function translates the received memory address into an NTB 2 memory address which in turn translates to another address and causing the transaction to be sent out upstream port 3. This transaction hits PCIe device 6 via port upstream port 3 and then downstream port 4. In response, if a transaction completion message is generated, then the completions message travels back the same path to the sending NTB function. The same process is carried out if the memory transaction hit NTB function 5 BAR x.

At present, most of PCIe switch and Processor manufactures supports NTB support. Thus all systems needing redundancy at PCIe hardware can use this solution. The embodiments thus provide high availability of PCIe devices when multiple processor root complexes are present in hardware. If one processor dies, any other active processor can take control of PCIe device. It helps in removing bottle neck in case of hardware failures.

The operations in the flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

Figure 2:
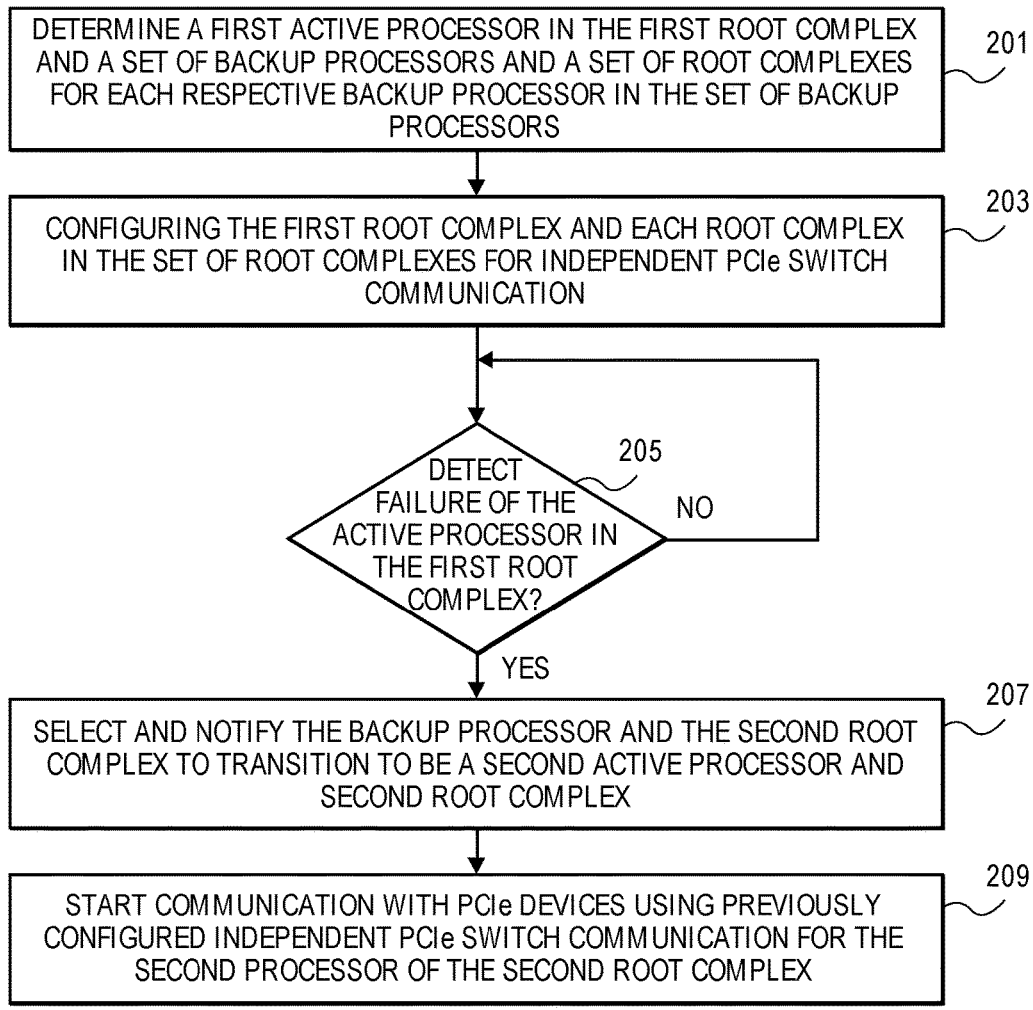
FIG. 2 is a flowchart of one embodiment of a process for network device configuration and handling of a switch from an active root complex and a backup root complex.

FIG. 2 is a flowchart of one embodiment of a process for network device configuration and handling of a switch from an active root complex and a backup root complex. In one embodiment, the process may be initiated during the start-up of the network device including the PCIe switch with NTB support where there are multiple processors and root complexes coupled to the PCIe switch. During the start-up process or thereafter, the network device can include a mechanism by which an active processor and standby processors are determined from the set of available processors in the network device (Block 201). Each root complex and processor then configures the PCIe switch for independent communication with separate enumerations of PCIe devices and configuration of respective configuration spaces within the partition of the processor and root complex as well as the partition of the PCIe switch (Block 203). The configuration of the PCIe switch is described in further detail herein below with relation to FIG. 3.

Once the PCIe switch has been configured for independent communication by each processor and root complex including separate enumeration, mapping tables and configuration space, the operation of the network device and the PCIe switch continues normally with the PCIe switch forwarding communication across the shared partition of the PCIe switch to reach the PCIe devices attached to the PCIe switch. During this operation, the network device monitors the operation of the processors and where a failure or loss of communication with one of the processors or root complex occurs (Block 205), the process selects on of the backup processor to become the new active process using any selection algorithm (Block 207). The selected processor is then notified of the selection to become the new active processor and the PCIe switch begins the transition to handling communications with the newly selected active processor. This transition is relatively seamless as the enumeration and configuration of the PCIe devices by the selected active processor has already occurred when the processor was the backup processor at system initialization. The newly selected active processor has also been updated of the configuration information of each PCIe device by the previous active processor thereby enabling the newly selected active processor to be master and controller of all PCIe devices (Block 209).

Figure 3:
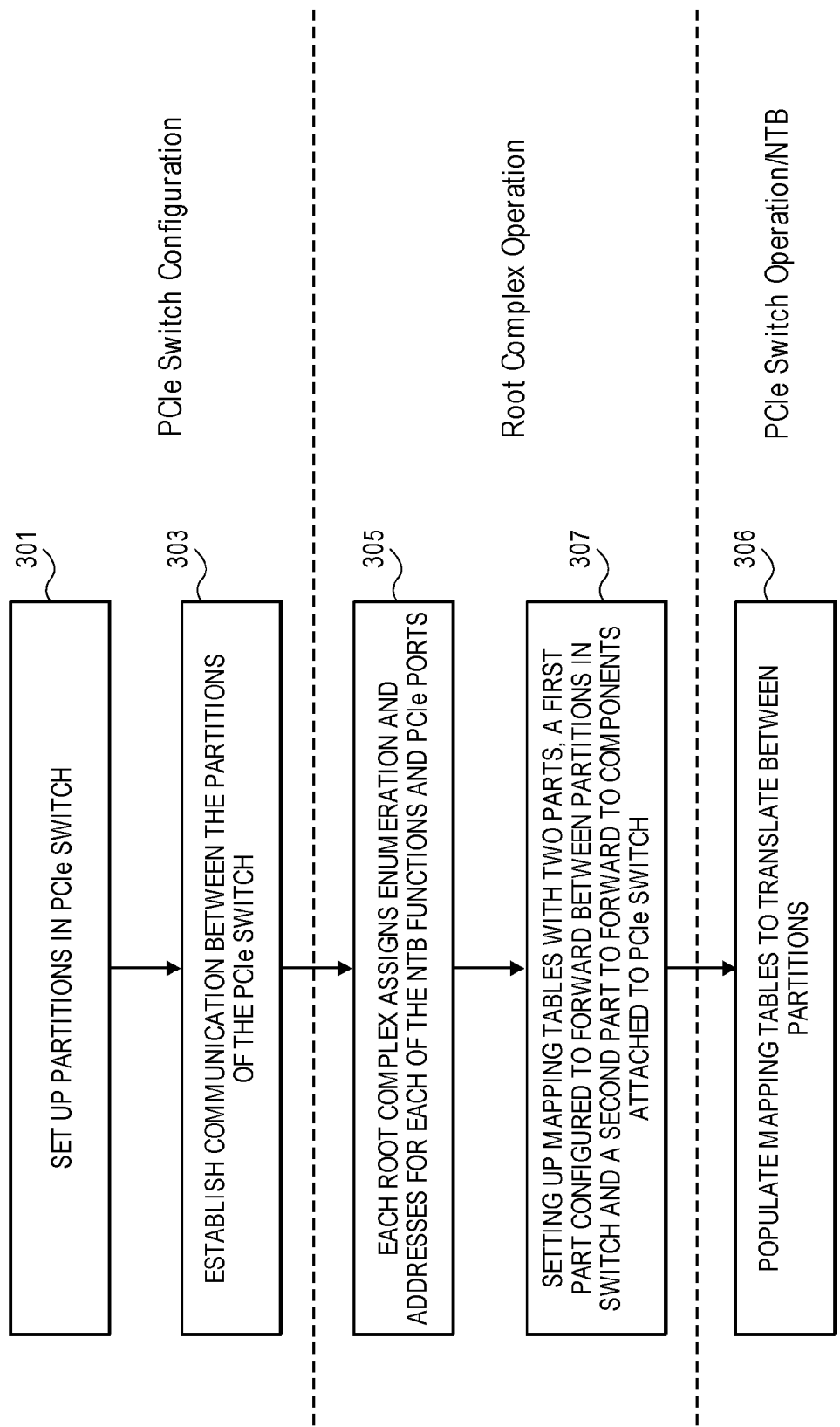
FIG. 3 is a flowchart of one embodiment of a process for configuration of the PCIe switch to enable efficient transition between active root complexes in the network device.

FIG. 3 is a flowchart of one embodiment of a process for configuration of the PCIe switch to enable efficient transition between active root complexes in the network device. During a start-up of the network device the PCIe switch configuration may be implemented. The configuration information may be stored in a dedicated configuration storage device or similar location. The configuration can include partition information, such that each partition acts as an independent PCIe switch. A partition may be established for each processor/root complex attached to the PCIe switch (Block 301). Additional partitions may be set up for each PCIe devices attached to the PCIe switch. A partition can also be established for an intermediate NTB function that communicates with NTB functions of the processor/root complexes to relay and translate the communications from those partitions to the partitions of the PCIe devices through external uplink ports. Communication between these partitions is also established via global registers of the NTB functions and PCIe switch internal communication protocols (Block 303).

With the PCIe switch and associated partitions established, the root complexes can each enumerate and provide address space for each of the NTB functions and PCIe ports within the associated partition (Block 305). Via the communication of the NTB functions in the partition of the processor and root complex, the processor can enumerate the PCIe devices attached to the other partitions. The processor also establishes PCIe mapping tables to track the relationship between address spaces in the partition of the respective processor/root complex and the address spaces of the NTB function partitions (Block 307). Subsequently, as PCIe devices are enumerated in the other partitions, the mapping tables are populated to map the address spaces of each PCIe device partition with the processor/root complex partition (Block 309).

ALTERNATIVE EMBODIMENTS

While embodiments of the invention has been described in relation to a network device with two processors and root complexes, other computing devices can utilizes this configuration and architecture. Therefore, embodiments of the invention are not limited to network devices. In addition, while embodiments of the invention have been described in relation to a singular PCIe device attached to the PCIe switch, alternative embodiments could be implemented such that any number or variety of PCIe devices may be utilized.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to configure an operation of a Peripheral Component Interconnect Express (PCIe) switch to enable an efficient transition from a first active processor in a first root complex to a backup processor in a second root complex, the method comprising:
   determining the first active processor in the first root complex, a set of backup processors, and a set of root complexes for each respective backup processor in the set of backup processors;
   configuring the first root complex and each root complex in the set of root complexes for independent PCIe switch communication;
   establishing partitions in the PCIe switch for each root complex, wherein each partition operates as an independent switch for independent PCIe switch communication;
   detecting a failure of the first active processor in the first root complex;
   selecting and notifying the backup processor of the second root complex and the second root complex to transition to be a second active processor and the second root complex; and
   starting communication with PCIe devices using the second active processor of the second root complex.

2. The method of claim 1, further comprising:
   establishing additional partitions in the PCIe switch for each PCIe device.

3. The method of claim 1, further comprising:
establishing communication between non-transparent bridge (NTB) functions in each partition of the PCIe switch.

4. The method of claim 1, further comprising:
enumerating each PCIe port and non-transparent bridge (NTB) function by each root complex independently.

5. The method of claim 1, further comprising:
setting up mapping tables with two parts, a first part of the mapping table being configured to forward data between partitions in the PCIe switch and a second part being configured to forward data to PCIe devices attached to the PCIe switch.

6. A network device to implement a method to configure an operation of a Peripheral Component Interconnect Express (PCIe) switch to enable an efficient transition from an active processor in a first root complex to a backup processor in a second root complex, the network device comprising:
the active processor in the first root complex configured for independent PCIe switch communication;
the PCIe switch configured to establish partitions in the PCIe switch for each root complex using PCIe switch configuration information, wherein each partition operates as an independent switch for independent PCIe switch communication;
the backup processor in the second root complex configured for independent PCIe switch communication, to detect a failure of the active processor and to start communication with a set of PCIe devices, in response to the failure of the active processor; and
the PCIe switch coupled to the first root complex and the second root complex, the PCIe switch to enable connectivity with the set of PCIe devices.

7. The network device of claim 6, further comprising:
a PCIe configuration storage, coupled to the PCIe switch, to store the PCIe switch configuration information.

8. The network device of claim 7, wherein the PCIe switch is further configured to establish additional partitions in the PCIe switch for each PCIe device using the PCIe switch configuration information.

9. The network device of claim 7, further comprising:
establishing communication between non-transparent bridge (NTB) functions in each partition of the PCIe switch.

10. The network device of claim 6, wherein the first root complex and the second root complex enumerate each PCIe port and non-transparent bridging (NTB) function of respective partition independently.

11. The network device of claim 6, wherein the PCIe switch is further configured to set up mapping tables with two parts, a first part of the mapping table being configured to forward data between partitions in the PCIe switch and a second part being configured to forward data to PCIe devices attached to the PCIe switch.

12. A non-transitory machine-readable storage medium that provides instructions that, if executed by a network device, will cause the network device to perform operations comprising:
determining a first active processor in a first root complex, a set of backup processors, and a set of root complexes for each respective backup processor in the set of backup processors;
configuring the first root complex and each root complex in the set of root complexes for independent Peripheral Component Interconnect Express (PCIe) switch communication;
establishing partitions in the PCIe switch for each root complex, wherein each partition operates as an independent switch for independent PCIe switch communication;
detecting a failure of the first active processor in the first root complex;
selecting and notifying a backup processor in the second root complex and respective root complex to transition to be a second active processor and the second root complex; and
starting communication with PCIe devices using the second active processor of the second root complex.

13. The non-transitory machine-readable medium of claim 12, having further instructions stored therein, which when executed cause the network device to further perform operations comprising:
establishing additional partitions in the PCIe switch for each PCIe device.

14. The non-transitory machine-readable medium of claim 12, having further instructions stored therein, which when executed cause the network device to further perform operations comprising:
establishing communication between non-transparent bridge (NTB) functions in each partition of the PCIe switch.

15. The non-transitory machine-readable medium of claim 12, having further instructions stored therein, which when executed cause the network device to further perform operations comprising:
enumerating each PCIe port and non-transparent bridging (NTB) function by each root complex independently.

16. The non-transitory machine-readable medium of claim 12, having further instructions stored therein, which when executed cause the network device to further perform operations comprising:
setting up mapping tables with two parts, a first part of the mapping table being configured to forward data between partitions in the PCIe switch and a second part being configured to forward data to PCIe devices attached to the PCIe switch.

* * * * *